United States Patent [19]

Dishong

[11] 4,223,636
[45] Sep. 23, 1980

[54] TRAINING LURE FOR RACING DOGS AND THE LIKE

[76] Inventor: Lester L. Dishong, P.O. Box 496, Highland, Calif. 92346

[21] Appl. No.: 949,949

[22] Filed: Oct. 10, 1978

[51] Int. Cl.³ ............................................. A01K 15/00
[52] U.S. Cl. ..................................................... 119/29
[58] Field of Search .................. 119/29, 29.5; 46/178, 46/180; 272/4

[56] References Cited

U.S. PATENT DOCUMENTS

| | | | |
|---|---|---|---|
| 1,789,333 | 1/1931 | Da Costa | 119/29.5 X |
| 2,185,547 | 1/1940 | Fowler | 119/29 |
| 2,782,558 | 2/1957 | Harley | 46/180 |
| 4,074,657 | 2/1978 | Senior et al. | 119/29 |

FOREIGN PATENT DOCUMENTS 8958 of 1928 Australia ........................................ 272/4

Primary Examiner—Russell R. Kinsey
Assistant Examiner—Robert P. Swiatek
Attorney, Agent, or Firm—John H. Crowe

[57] ABSTRACT

A lure for training racing dogs in which the lure is conveyed along a track just ahead of the dogs. The lure, which includes a hollow cylinder of sufficient strength to prevent crushing by the dogs, is suspended for swinging and a limited up and down movement. An air operated sound producing device is supported within the cylinder and, in turn, supports the upper end of an extendible bellows having a weighted lower end whereby endwise shaking movement of the lure will cause a sound to be emitted simulating an animal in distress or being chased. The cylinder is encased within a resilient compressible casing surrounded by a tough flexible skin to simulate the feel of the body of an animal.

3 Claims, 4 Drawing Figures

TRAINING LURE FOR RACING DOGS AND THE LIKE

BACKGROUND OF THE INVENTION

1. Field of the Invention

This invention relates to animal lures and has particular reference to lures for training racing dogs and similar animals.

2. Description of the Prior Art

In the art of training and racing dogs, such as greyhounds, live rabbits were previously used for centuries as lures to induce the dogs to run at their maximum-speed. Later, in modern times, laws were passed prohibiting the use of live rabbits as being inhumane, and in their place, dead rabbits or artificial lures simulating rabbits are employed. In such case, whether the track is a straightaway or a closed track, a suitable carriage is provided which supports the lure. The carriage is driven at a controlled speed just ahead of the dogs to entice them to run as fast as possible.

It is known that the lure need not look like a rabbit or similar animal in order to be generally effective, as long as it is of the same general size and is moved at an appropriate speed. However, I have discovered that by causing the lure to emit a sound similar to a distressed rabbit, etc., an increased interest is aroused in the dogs which keeps their interest focused on the lure throughout the racing procedure.

Further, I have discovered that, when training dogs in the sport of racing, it is best to allow them to touch or strike the lure from time to time while running to prevent loss of interest in the lure and to fulfill the objective of running the full course of the track at their utmost speed. Obviously, this is important in training dogs to win races but also, if a dog becomes disinterested, it may consciously or unconsciously interfere with other dogs which is a serious infraction of the rules of the sport.

I have further discovered that by making the lure with sections of black and white color, the lure appears to improve the dogs' interest.

Accordingly, a principal object of the present invention is to provide an artificial lure for training racing animals which is highly appealing to the animals and will hold their interest over a long period of time.

Another object is to provide an artificial training lure of the above type which will emit a sound similar to an animal being chased.

Another object is to provide an artificial training lure of the above type which will withstand striking and beating by animals being trained.

Another object is to provide an artificial training lure of the above type which feels like the body of an animal.

A further object is to provide an artificial training lure of the above type which is inexpensive to manufacture and assemble.

SUMMARY OF THE INVENTION

According to the present invention, an artificial training lure is provided comprising an elongate cylinder which is strong enough to prevent crushing by an animal's body. The cylinder is suspended in a vertical position at one end and an air actuated sound producing device for emulating an animal being chased or in distress is supported in protected position within the cylinder. A resilient elongate bellows, also within the protective cylinder, is attached at its upper end to the sound producing device and is weighted at its lower end so as to actuate the sound producing device when the lure is jostled or bounced about either by the animals themselves or by the means for transporting the lure while it is being chased by the animals.

According to the more specific aspect of the invention, a casing of resilient material, such as sponge rubber, is compressed around the cylinder by a relatively tough flexible skin, preferably an animal hide, having an outer layer of hair with contrastingly colored sections, thus providing a relatively soft structure simulating, in both appearance and feel, the body of an animal.

BRIEF DESCRIPTION OF THE DRAWINGS

The manner in which the above and other objects of the invention are accomplished will be readily understood on reference to the following specification when read in conjunction with the accompanying drawing, wherein.

DESCRIPTION OF THE PREFERRED EMBODIMENT

Figure 1:
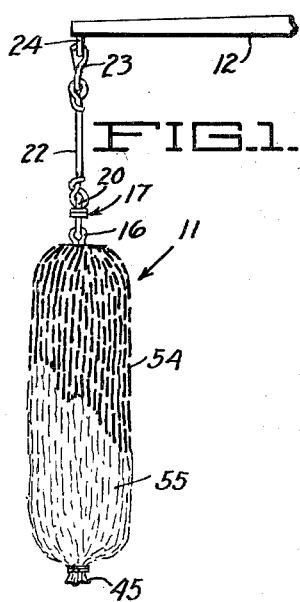
FIG. 1 is a side elevation view of an artificial training lure embodying a preferred form of the present invention and showing the same suspended by a suitable carriage device for conveying the same along a track ahead of the dogs being trained.

Although this invention is susceptible to embodiment in many different forms, there is shown in the drawings and will be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing, the training lure is indicated generally at 11 as being elongated and suspended from an arm 12 of a carriage (not shown) which is suitably driven along a track at a controlled speed such that the lure can be conveyed just ahead of the dogs being trained or at times it may be slowed down to permit the dogs to catch up to jostle the lure. Preferably, the arm 12 or the carriage supporting the same is somewhat flexible to permit a limited up and down bouncing movement due to the dogs touching or bouncing the same or due to slight unevenness of the guiding surface along which the carriage is driven.

Figure 2:
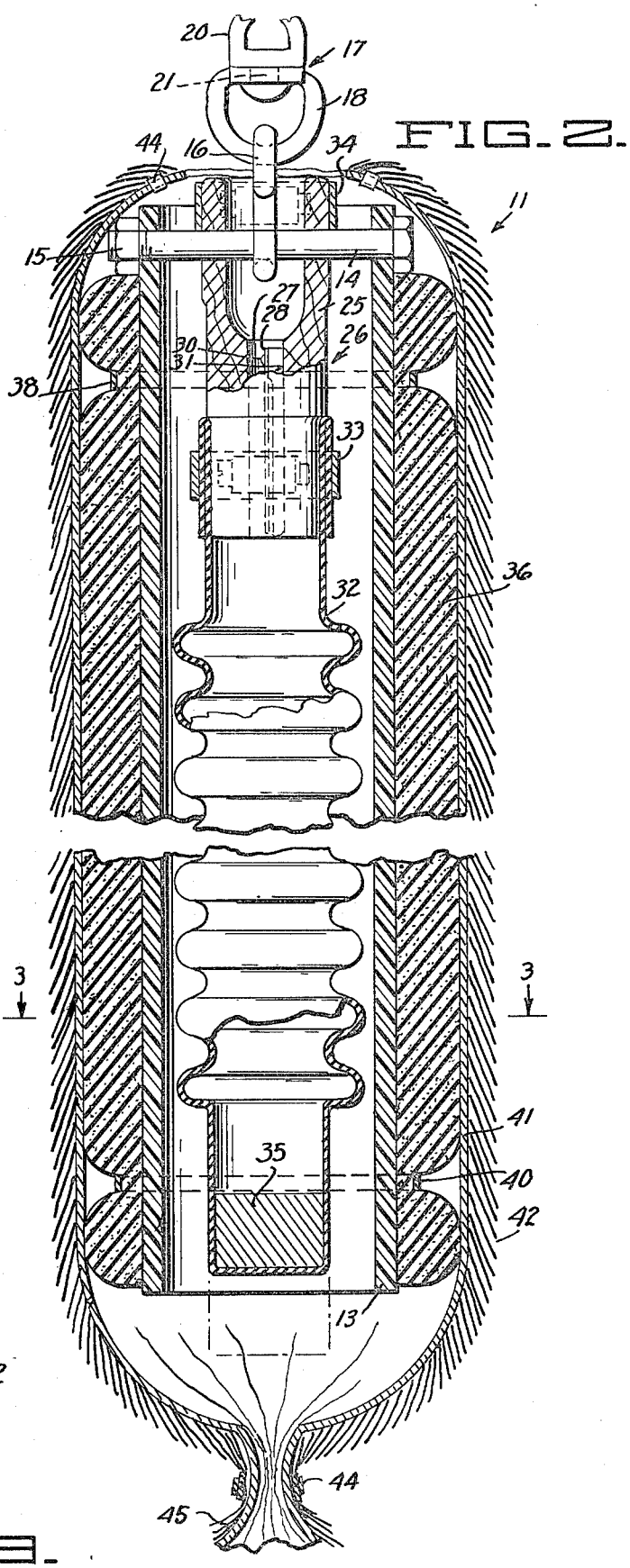
FIG. 2 is an enlarged sectional elevation view, partly broken away, of the lure.

As seen in FIG. 2, the lure 11 comprises a hollow cylinder 13, preferably of plastic, having a strength sufficient to resist crushing by dogs when bouncing or hitting the lure. A bolt 14 is passed transversely through the cylinder 13 adjacent the upper end thereof and is held in place by a nut 15 threaded on the bolt. An S-hook 16 in the shape of the figure eight connects the bolt 14 to a swivel generally indicated at 17. The latter comprises a ring 18 pivotally connected to a second ring 20 by a pivot stud 21 to permit free rotation of the lure 11 about the vertical axis thereof.

A flexible cable 22 is connected at its lower end to the ring 20 of swivel 17 and at its upper end to a snap element 23 which, in turn, is removably attached to an eye 24 carried by the outer end of the carriage arm 12. Thus, the lure 11 may be freely swung in any direction about the supporting eye 24 and may also be freely rotated, making it appealing to the dogs attempting to catch it.

The bolt 14 also extends transversely through the upper end of a hollow cylindrical member 25 of wood or the like forming part of a sound producing device generally indicated at 26 to suspend the same in a protected location within the cylinder 13. The member 25 has an axially extending reduced diameter hole 27 therein, in which is mounted a metal vibrating reed 28. The latter is secured at its upper end, at 30, to a base 31 fastened within the hole 27. when a stream of air is passed upwardly through the hole 27, the reed 28 will rapidly vibrate against the base 31 to emit a sound similar to that made by a rabbit in distress or being chased.

A generally cylindrical bellows 32 of thin resilient material, such as rubber or other elastomeric material, is fitted over the lower end of member 25 and is clamped thereon by a suitable metal clamp 33. A similar clamp 34 is clamped around the upper end of the member 26 to support the same against breaking or splitting during violent movement of the lure.

The bellows 32 is closed at its lower end and has a metal weight 35 fitted therein so that when the lure is shaken vertically, the bellows will repeatedly contract and expand to force a stream of air through the opening 27 of member 25 to vibrate the reed 28.

It will be noted that the bellows 32 is guided lengthwise within the cylinder 13 and is protected against damage by such cylinder.

The aforementioned sound producing device is, per se, similar to that commercially available under the trademark "Scotch" manufactured by Scotch Game Call Company of Oakfield, N.Y.

Figure 3:
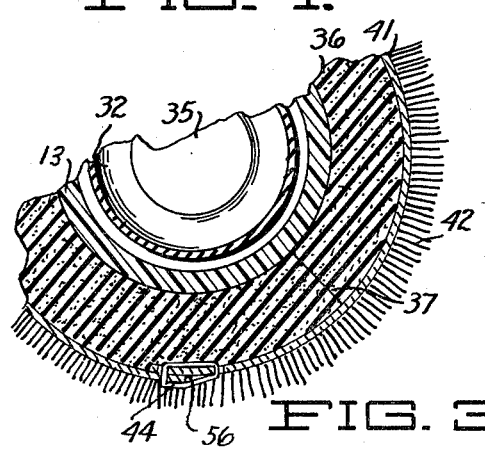
FIG. 3 is a sectional plan view, partly broken away, and taken along the line 3—3 of FIG. 2.

A relatively thick casing 36 of polyurethane foam, sponge rubber, or the like surrounds the cylinder 13 and extends substantially the same length. The casing 36 is formed of a sheet of material which is wrapped around the cylinder 13 with its ends abutting each other as seen at 37 in FIG. 3. In forming the casing 36, the sheet is preferably bonded by a suitable adhesive to the cylinder 13 and is held in place until the adhesive sets by a plurality of endless rubber bands (not shown) stretched thereover. Thereafter, all of the bands but two endmost ones 38 and 40 are removed. The latter two bands are left in place to help maintain the casing 36 in place.

A skin 41, preferably cow hide, having a layer of downwardly extending hair 42 on the outside thereof is tightly wrapped over the casing 36, with its adjacent ends 56 and 57 in overlapping relation. The skin also extends somewhat above and below the opposite ends of the cylinder 13.

Figure 4:
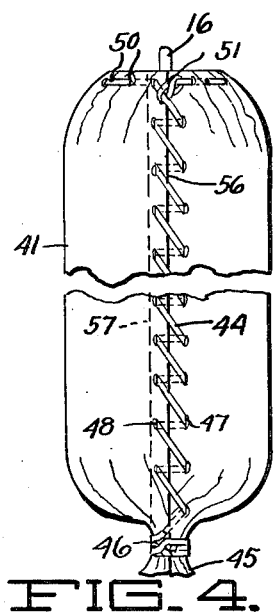
FIG. 4 is a side elevation view showing the lure with the outer layer of hair removed to depict the manner of attaching the outer skin over the remainder of the lure assembly.

A cord 44 is wrapped several times around the downwardly projecting portion of the skin 41 causing the skin to converge or bunch at 45, thereby substantially closing the lower end of the lure. The cord 44 is tied at 46 (FIG. 4) and is then laced through openings 47 and 48 in the adjacent overlapping ends of the skin 41, whereby the skin may be drawn tightly against the casing 36.

The upper end of the cord 44 is passed in and out through a series of holes 50 spaced arond the upper end of the skin and is drawn taut, causing such upper end to converge or bunch over the top of the cylinder 13. The cord is then tied at 51.

Due to the intimate engagement of the skin 41 with the outer surface of the casing 36 and to the bunched condition of the skin 41 at opposite ends of the lure, it is not possible for the dogs to remove the skin. Also, the lower bunched formation 45 of the skin forms a stop against which the bellows 32 may limit during violent shaking movement of the lure. On the other hand, the skin may be readily removed and replaced when desired.

Due to the resilient compressible nature of the casing 36 and the tough flexible skin 41, the lure presents a feel similar to that of the body of a rabbit or similar animal.

It is preferable to use cow hide for the skin 41 because of its property of withstanding continued abuse. Also, such hides are available with naturally contrasting colored sections as indicated by the black section 54 and the white section 55 in FIG. 1. This has been found to provide a more life-like end enticing appearance to racing dogs.

In use, as the lure 11 is carried around the track, any vibration of the transporting carriage will shake the lure vertically to cause the bellows 32 to actuate the sound producer 26 so that the lure will more or less continuously emit an animated sound. However, when the lure is bounced or jostled by one or more dogs chasing it, it will create a louder sound which tends to further excite the dogs.

It will be noted that the cylinder 13 protects the sound device 26 and bellows 32 from damage due to violent handling of the lure. The cylinder also guides the bellows 32 and also forms a firm base for supporting the relatively soft outer casing 36.

From the foregoing it will be observed that numerous variations and modifications may be effected without departing from the true spirit and scope of the novel concept of the invention. For example, although only one cord 44 is disclosed, several may be used to draw the skin 41 against the casing 36. Also, a conventional zipper can be used in lieu of the cord 44 for such purpose.

I claim:

1. A training lure for a racing animal comprising
a hollow cylinder having sufficient strength to prevent collapse by said animal,
an elongate support member extending transversely through said cylinder adjacent one end of said cylinder,
suspending means attached to said support member for supporting said cylinder in a vertical position,
an air actuated sound producing device supported by said support member within said cylinder,
an elongate resilient bellows within said cylinder,
said bellows being secured at the upper end thereof to said sound producing device in communication with said device,
said cylinder guiding said bellows for lengthwise movement,
weighted means at the lower end of said bellows for causing extension and contraction of said bellows upon vertical shaking movement of said lure whereby to force air through said device,
a casing of resilient compressible material surrounding said cylinder, and
a flexible skin surrounding said casing, said skin being effective to withstand abuse by said animal and said resilient material being compressible when said lure is struck by said animal.

2. A training lure as defined in claim 1 wherein said skin comprises
   an animal hide having hair extending therefrom on the side opposite said casing,
   said hair having sections of contrasting color.

3. A training lure as defined in claim 1 wherein said suspending means comprises
   swivel means supporting said cylinder for rotation about the axis of said cylinder,
   said suspending means supporting said lure for swinging movement in different directions about a point located above said lure.

* * * * *